Figure 1:
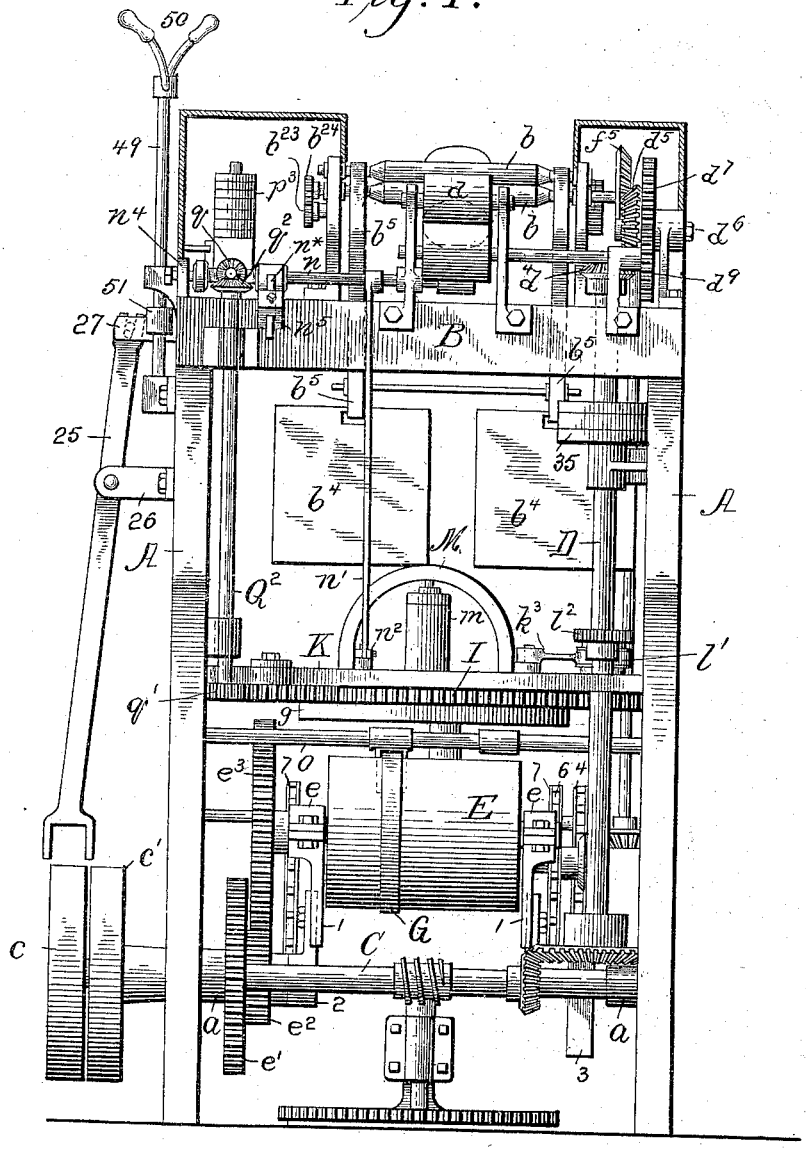

No. 655,934. Patented Aug. 14, 1900.
A. W. MATHEWSON.
RAILWAY HEAD.
(Application filed Apr. 11, 1899.)

(No Model.) 9 Sheets—Sheet 1.

No. 655,934. Patented Aug. 14, 1900.
A. W. MATHEWSON.
RAILWAY HEAD.
(Application filed Apr. 11, 1899.)
(No Model.) 9 Sheets—Sheet 2.

WITNESSES:

INVENTOR
Arthur W. Mathewson
BY
Appleton
ATTORNEY

No. 655,934. Patented Aug. 14, 1900.
A. W. MATHEWSON.
RAILWAY HEAD.
(Application filed Apr. 11, 1899.)
(No Model.) 9 Sheets—Sheet 3.

WITNESSES:

INVENTOR
Arthur W. Mathewson.
BY
Wm H. Appleton,
ATTORNEY

No. 655,934. Patented Aug. 14, 1900.
A. W. MATHEWSON.
RAILWAY HEAD.
(Application filed Apr. 11, 1899.)
(No Model.) 9 Sheets—Sheet 4.

No. 655,934.  
A. W. MATHEWSON.  
RAILWAY HEAD.  
(Application filed Apr. 11, 1899.)

Patented Aug. 14, 1900.

(No Model.)

9 Sheets—Sheet 5.

WITNESSES:

INVENTOR  
Arthur W. Mathewson  
BY  
ATTORNEY

No. 655,934.  
A. W. MATHEWSON.  
RAILWAY HEAD.  
(Application filed Apr. 11, 1899.)  
Patented Aug. 14, 1900.

(No Model.)

9 Sheets—Sheet 6.

WITNESSES:

INVENTOR  
Arthur W. Mathewson  
BY  
ATTORNEY

No. 655,934. Patented Aug. 14, 1900.
A. W. MATHEWSON.
RAILWAY HEAD.
(Application filed Apr. 11, 1899.)
(No Model.) 9 Sheets—Sheet 7.
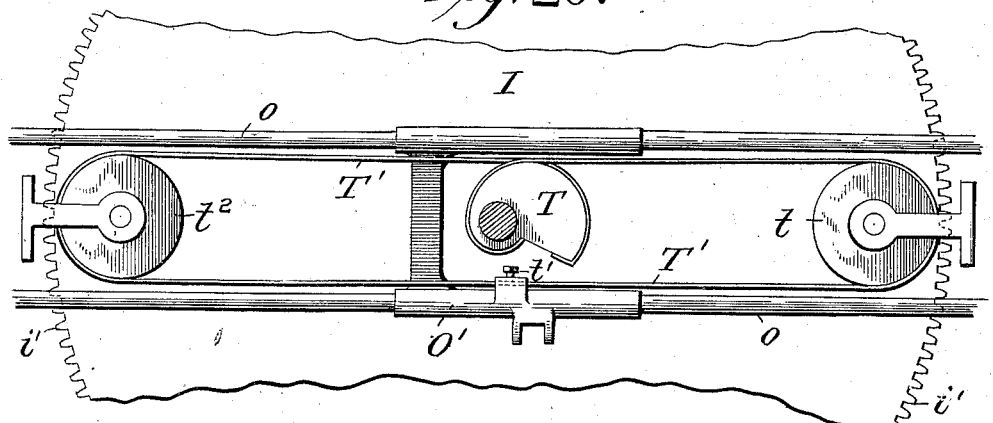
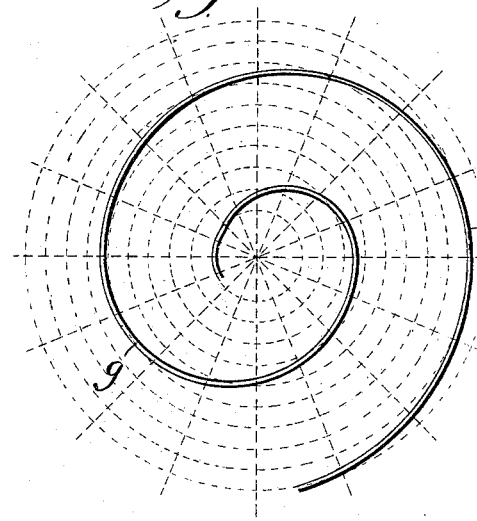
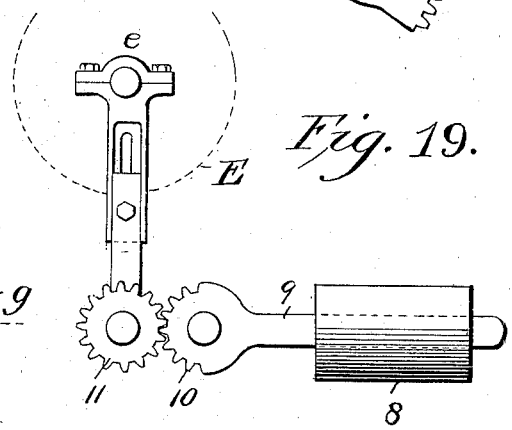
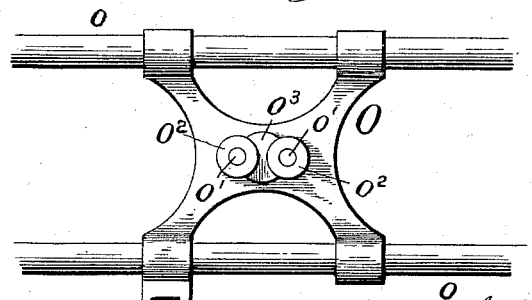
WITNESSES: INVENTOR
Arthur W. Mathewson
BY
ATTORNEY No. 655,934.  
A. W. MATHEWSON.  
RAILWAY HEAD.  
(Application filed Apr. 11, 1899.)  
Patented Aug. 14, 1900.
(No Model.)
9 Sheets—Sheet 8.
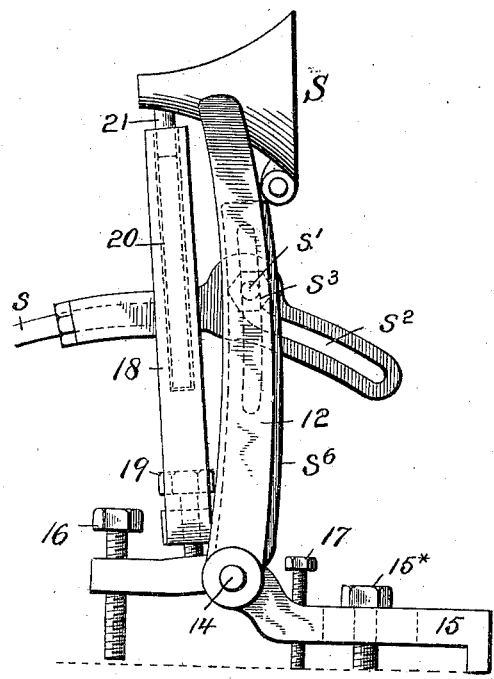
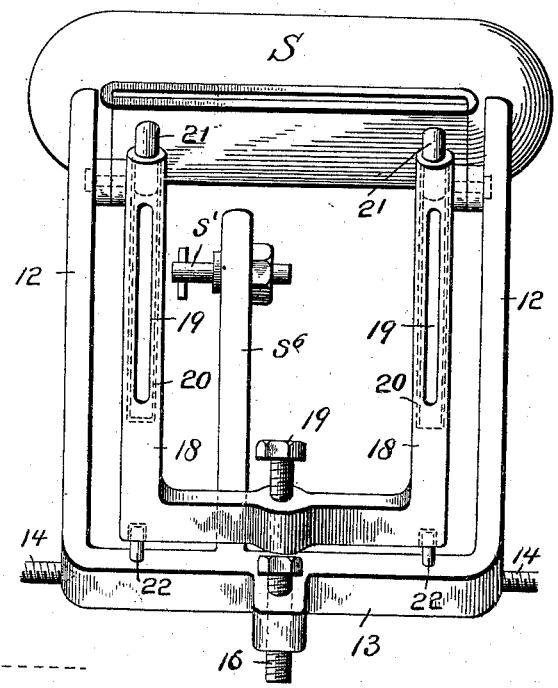
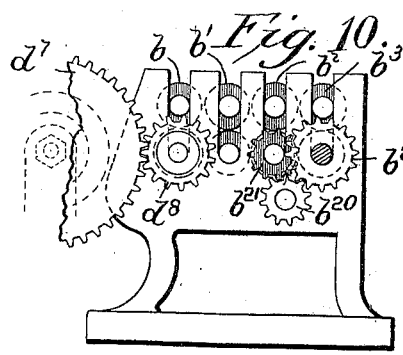
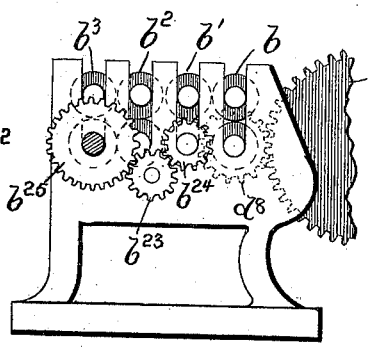
WITNESSES:
INVENTOR  
Arthur W. Mathewson  
BY  
ATTORNEY No. 655,934.   
A. W. MATHEWSON.  
RAILWAY HEAD.  
(Application filed Apr. 11, 1899.)  
Patented Aug. 14, 1900.

(No Model.)  
9 Sheets—Sheet 9.

WITNESSES:

INVENTOR  
Arthur W. Mathewson  
BY  
ATTORNEY

UNITED STATES PATENT OFFICE.

ARTHUR W. MATHEWSON, OF LEWISTON, MAINE, ASSIGNOR OF ONE-HALF TO HERBERT L. PRATT, OF SAME PLACE.

RAILWAY-HEAD.

SPECIFICATION forming part of Letters Patent No. 655,934, dated August 14, 1900.

Application filed April 11, 1899. Serial No. 712,612. (No model.)

*To all whom it may concern:*

Be it known that I, ARTHUR W. MATHEWSON, a citizen of the United States, and a resident of Lewiston, in the county of Androscoggin and State of Maine, have invented certain new and useful Improvements in Railway-Heads, of which the following is a specification.

My improvements, while applicable in whole or in part to the various forms of railway-heads heretofore in use, are designed with more especial reference to the form of railway-head which is illustrated and described in United States Letters Patent No. 565,084, that were granted to me August 4, 1896, their object being to simplify the construction of this general class of machine and while making them more compact in form and sensitive in operation to render them more efficient and reliable in action than has been possible with machines of this class as heretofore constructed. To accomplish all of this and to secure other and further advantages in the matters of construction, operation, and use, my invention consists, first, in the means through which the front or last pair of drawing-rolls and the calender-rolls are operated from the main driving-shaft of the machine; second, in an evener mechanism and in the means through which the back pairs of drawing-rolls are operated from the cone-pulley of the machine and the speed of rotation of these pairs automatically varied in their speed with respect to the speed of the front pair of drawing-rolls as the condition of the material passing through the machine may demand; third, in mechanism through which the trumpets are counterbalanced and devices through which this mechanism is both thrown out of operation when the weight thereon has been moved in either direction beyond certain limits and afterward brought back into operation when the weight is retracted therefrom; fourth, in evener drums or pulleys and in the appliances through which the belt passing over them is maintained at a uniform tension at any position to which it may be adjusted; fifth, in means through which the stop-motion of the machine is operated, and, sixth, in various other novel and useful constructions and combinations of devices, all as will hereinafter more fully appear.

Figure 2:
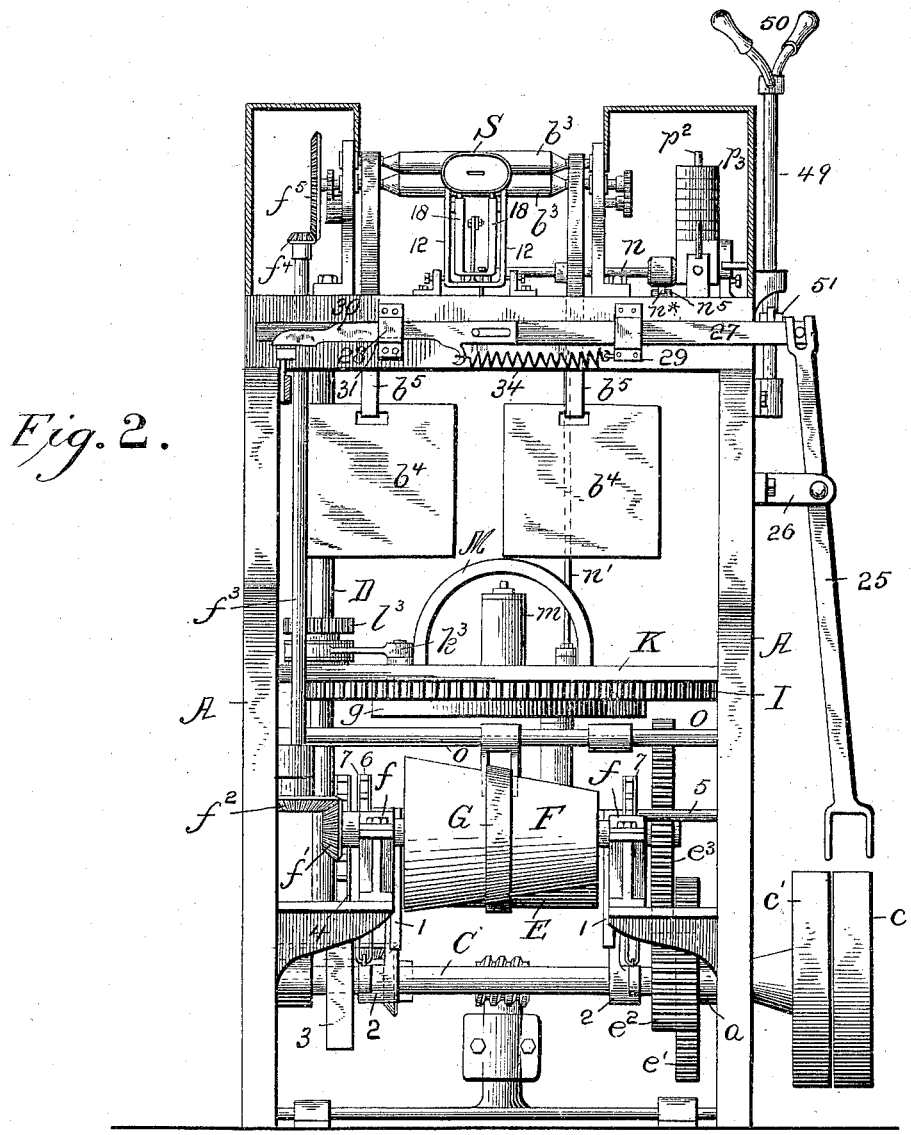
Figure 3:
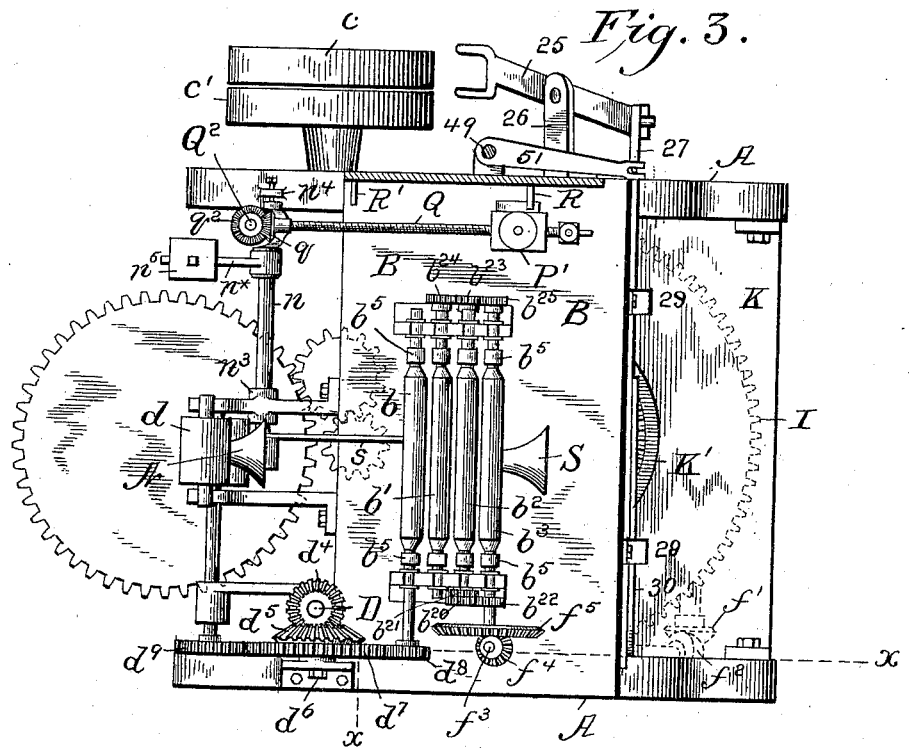
Figure 17:
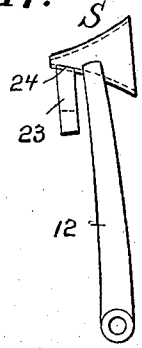
Figure 18:
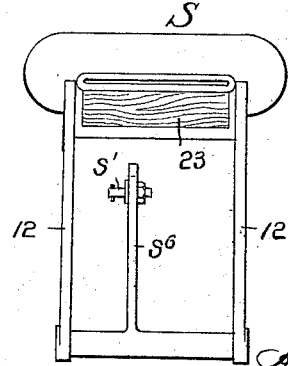
Figure 4:
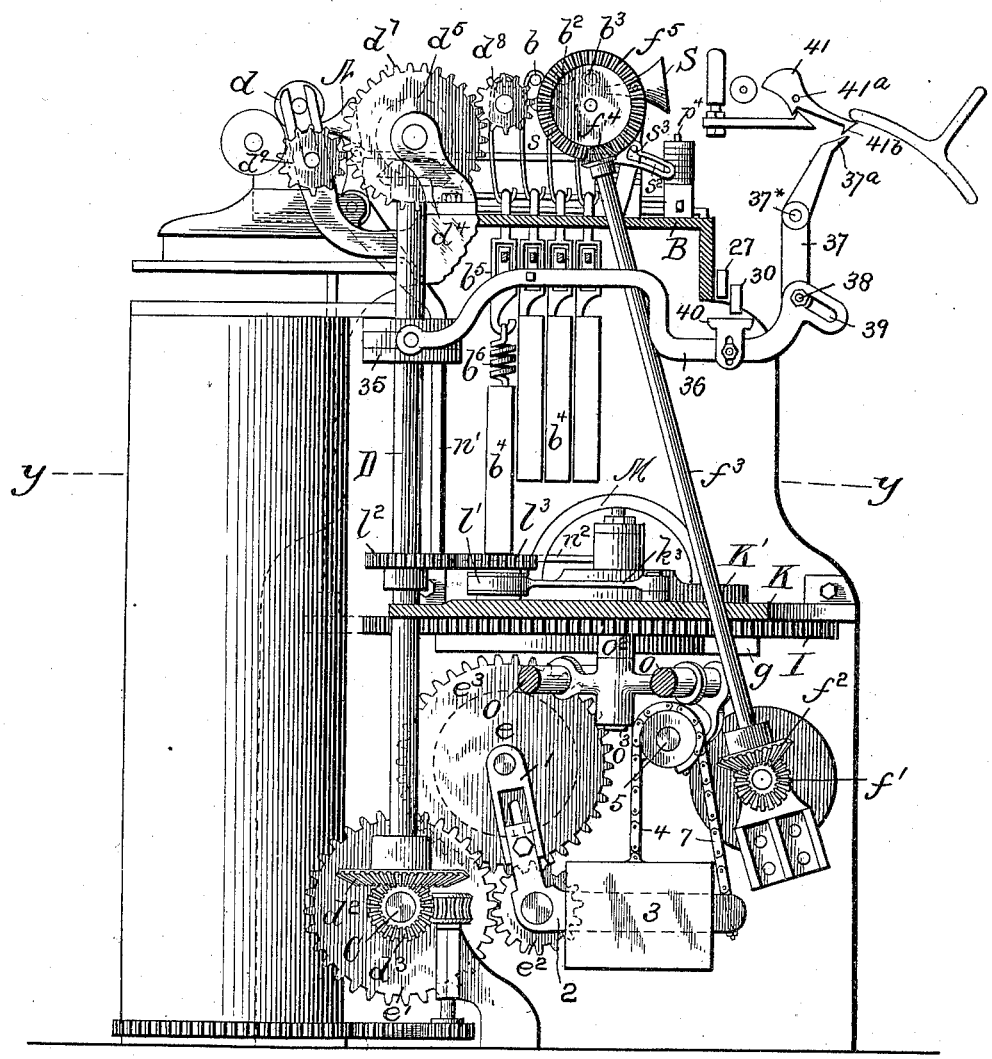
Figure 5:
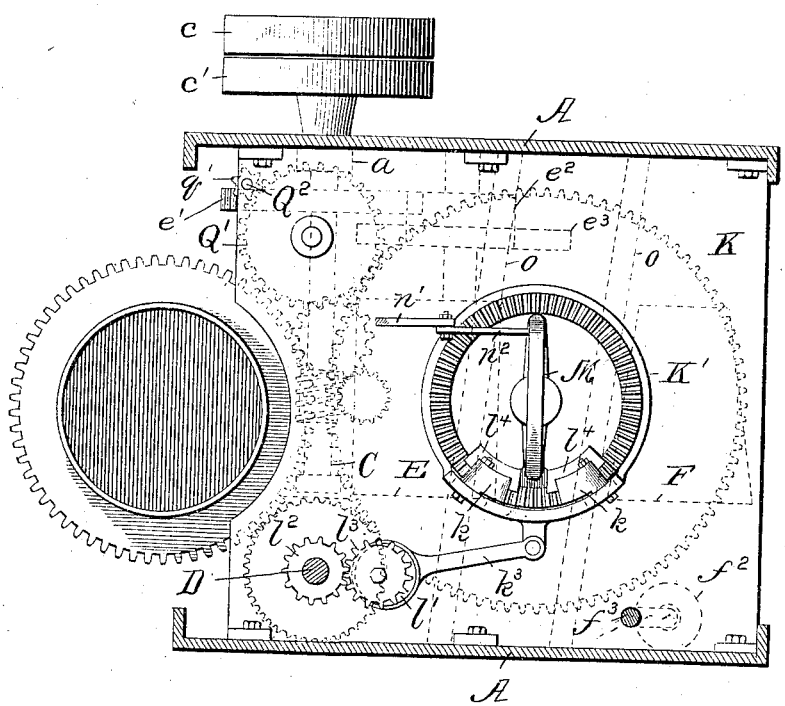
Figures 6, 7:
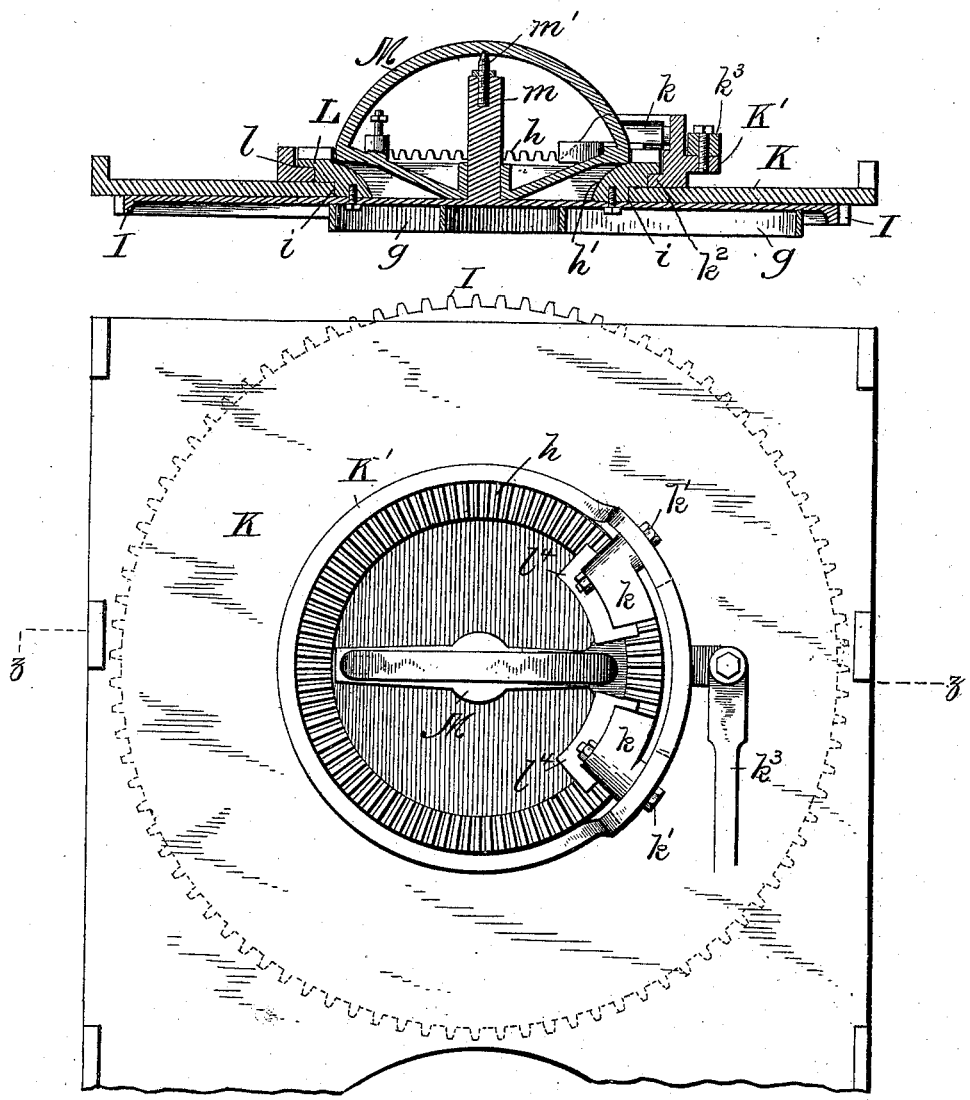
Figure 13:
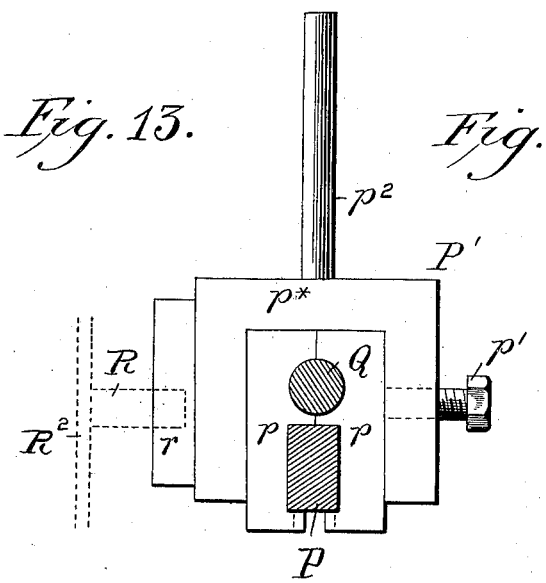
Figure 14:
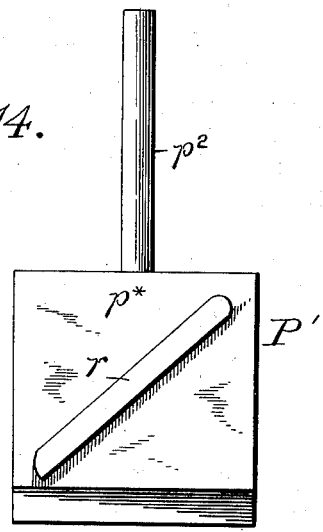
Figure 12:
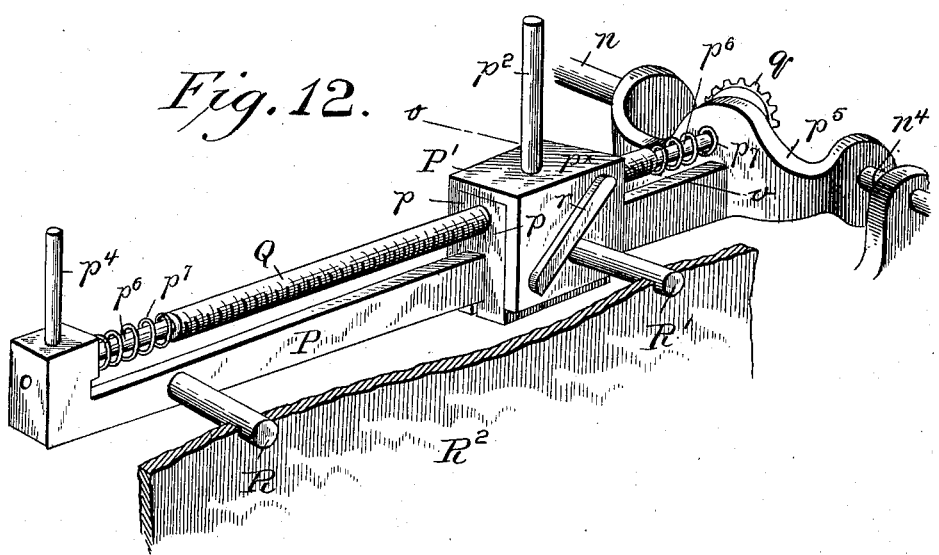

In the accompanying drawings, which form a part of this specification, Figure 1 is a front elevation of a railway-head constructed in accordance with my invention, certain of the protectors for the gearing being shown in section; Fig. 2, a rear elevation thereof showing in like manner the protectors in section; Fig. 3, a top or plan view of the machine with one of the gear-protectors omitted and the outer wall of the other shown in section; Fig. 4, a vertical view, partly in section and partly in elevation, taken in the line $x$ $x$ in Fig. 3; Fig. 5, a horizontal view, partly in section and partly in plan, taken in the plane $y$ $y$ of Fig. 4; Fig. 6, a horizontal detail plan, also taken in the plane $y$ $y$ of Fig. 4, but on an enlarged scale, with some of the parts shown in Fig. 5 omitted; Fig. 7, a vertical section of the parts shown in Fig. 6, taken in the plane $z$ $z$ of that figure; Fig. 8, a reverse plan view, in diagrammatic form, of the evener-scroll or snail-wheel through which the belt is automatically adjusted upon the evener drums or pulleys; Fig. 9, a detail plan showing the evener-belt shifter and the means by which it is supported and guided; Fig. 10, a side elevation of one of the roll-stands, showing the ends of the drawing-rolls mounted therein and certain of the gears through which a portion of these rolls are rotated at the required speed; Fig. 11, a side elevation of the other of the roll-stands, showing the other ends of the drawing-rolls and certain of the gears through which the remainder of these rolls are rotated at their required speed; Fig. 12, an isometric projection of the weight and lever through which the counterbalancing of the trumpet is effected, showing also a portion of the protector in section and the adjustable pins or projections for coöperating with the lever when the weight thereon is moved beyond certain limits in either direction; Fig. 13, a transverse section of the lever and screw, taken in the plane $v$ $v$ of Fig. 12, with the weight shown in elevation; Fig. 14, a side elevation of the counterbalancing-weight detached from the lever; Fig. 15, a side elevation of the rear trumpet and its supporting-stand with a portion of the rod by which this trumpet is connected with the front trumpet; Fig. 16, a back view of the rear trumpet detached from its stand, but showing a portion of its supporting pivots or centers; Fig. 17, a side elevation of a slightly-modified construction of rear trumpets; Fig. 18, a back view thereof; Fig. 19, a side elevation of a slightly-modified form of mechanism for maintaining a uniform tension upon the evener-belt as it is adjusted back and forth upon the evener drums or pulleys; and Fig. 20, a reverse view of a slightly-modified arrangement of parts for moving the evener-belt shifter back and forth upon its guide as the requirements of the machine when in operation may demand.

In all the figures like characters are employed to designate corresponding parts.

A A indicate the side brackets or standards, B the top or table secured on the standards at their upper ends, and C the main driving-shaft, through which the various parts of the machine are operated, the driving-shaft being provided at one of its ends with a fast pulley $c$ and a loose pulley $c'$. The side brackets or standards A are or may be of any approved construction and design and are preferably provided with suitable bearings $a$ for the main driving-shaft C, said side brackets forming, with the table B, the main framing of the machine.

The front drawing-rolls are indicated at $b$, the back drawing-rolls at $b'$, $b^2$, and $b^3$, and the calender-rolls at $d$. The drawing-rolls are arranged in pairs, with the upper roll of each pair pressed against its companion under roll by a weight $b^4$, that is suspended therefrom by a suitable saddle or link $b^5$, as shown in Figs. 1, 2, and 4, one or more of said weights having a spring or springs $b^6$ interposed between it or them and the said saddle or saddles, if desired. The calender-rolls $d$ are in like manner held in contact by pressure, as is common to this class of machines, and these rolls and the front drawing-rolls $b$ are driven by the main driving-shaft C through connections as follows: D indicates a vertical shaft mounted in suitable bearings supported by one of the said brackets of the machine and having a bevel-gear $d^2$ at its lower end meshing with a bevel-gear $d^3$ on shaft C. This shaft D is also provided with a bevel-gear $d^4$ at its upper end meshing with a bevel-gear $d^5$, which is rotatively carried by a stud $d^6$, supported by the frame of the machine. Mounted to rotate with the gear $d^5$ is a spur-gear $d^7$, (see Figs. 1 and 3,) which meshes with spur-gears $d^8$ $d^9$, secured to the lower shafts of the pairs of front drawing-rolls and calender-rolls, respectively. These connections, as will be readily understood, insure a uniform speed of the front drawing-rolls and the calender-rolls under all conditions. The back drawing-rolls $b'$ $b^2$ $b^3$, on the other hand, while receiving motion from the main driving-shaft C, are connected and arranged to have their speed of rotation automatically varied relatively to the speed of rotation of the front drawing-rolls whenever the quantity of material passing through the machine varies, and hence requires a variation in the drawing action to insure the production of a sliver of uniform size and weight throughout. For effecting this variation in the speed of the rear pairs of drawing-rolls with respect to the speed of the front pair of drawing-rolls automatically I make use of a peculiarly-constructed evener mechanism, which will now be described.

E indicates a cylindrical drum, which is mounted to turn in or on suitable bearings $e$ and is driven at a uniform rate of speed from the main driving-shaft, according to the speed of the latter, by means of the train of gears $e'$ $e^2$ $e^3$, as shown in Figs. 1, 2, and 4.

F indicates a conical drum, which is mounted to turn in suitable bearings $f$, carried by the frame A, and is provided on one end of its supporting-shaft with a bevel-gear $f'$, that intermeshes with a second bevel-gear $f^2$, secured to the lower end of a vertical shaft $f^3$, which in turn is provided at its upper end with a bevel-gear $f^4$, that intermeshes with a corresponding bevel-gear $f^5$, preferably secured to the end of the lower drawing-roll of the extreme back pair $b^3$, to which the material passing through the machine is delivered.

The cylindrical drum E and conical drum F are connected by an endless belt G, and as the drum F is operated by the drum E through the belt the speed of the drum F relatively to that of the drum E and the speed of the back pairs of drawing-rolls relatively to the speed of the front pair and the calender-rolls will depend, as is obvious, upon the position of the endless belt G longitudinally upon these drums. The speed of the back drawing-rolls being thus dependent upon the position occupied by the belt G along the drums E and F, any required variation in the speed of the back rolls relatively to the speed of the front drawing-rolls may be effected by simply shifting this belt longitudinally thereon. To automatically accomplish this movement of the belt along the drums as the conditions of the material passing through the machine may require, various means may be employed. I prefer, however, to make use of a disk I, which is provided on its under surface with a narrow scroll-flange $g$ and is supported by a plate or deck K and against the under side thereof. This plate or deck K is secured at two of its edges to the frame-brackets A and, extending across from one to the other of said brackets, constitutes, with the disk I, an effective shield for preventing the dropping of oil or other lubricant upon the belt G and drums E and F, which are disposed below it, the said plate or deck being made either plain or dish-shaped, as may be found the most desirable. As thus arranged a circular orifice $i$ is formed in the plate or deck K, which orifice receives an annular neck $h'$, formed on the under side of a circular rim or wheel L, and to the lower end of this neck the disk I is secured by screws $h^2$. (See Fig. 7.) The wheel L being thus disposed rests on the plate or deck K around the orifice $i$ thereof and is adapted to rotate thereon, being formed with an external annular recess $l$ and with radial teeth $h$ on its upper face, the function of which latter will be presently explained. With the disk I supported by the plate or deck K and capable of a rotary motion relatively thereto, as explained, the required movement of the scroll-flange $g$ carried thereby may be effected by simply rotating the ratchet-wheel L in one or the other directions, as may be required.

Resting upon the plate K, as shown in Figs. 6 and 7, is a ring or annulus K', which is formed with a flange $k^2$, that enters the recess $l$ of the ratchet-wheel L and is provided with two studs $k'$, that are adjustably secured in slots formed in said annulus, as indicated by dotted lines in Fig. 6. Mounted on the studs $k'$ $k'$ are pawls $k$, that are preferably though not necessarily arranged facing each other. These pawls are adapted to engage with the teeth $h$ of the wheel L when permitted to do so, as presently explained, in order to move the said wheel, and consequently the scroll-flange, in either direction, the said annulus K' and its pawls $k$ being given a rotary reciprocating movement by means of a pitman $k^3$, connecting the annulus K' with an eccentric $l'$. (See Figs. 4 and 5.) A gear $l^2$ on the vertical shaft D meshes with a gear $l^3$, mounted to rotate on or with a short stud suitably supported by the plate K, the eccentric $l'$ being operatively connected with said gear $l^3$, thus providing for the constant rotary reciprocating motion of the annulus and its pawls.

For holding either or both of the pawls $k$ out of engagement with the teeth $h$ of the ratchet-ring L when the ring and with it the scroll-flange $g$, which operates the shifter O for the belt G, as hereinafter described, are to remain stationary and permit of their engagement therewith when the ring and scroll are to be rotated in either direction various means may be employed. The means which I have found the most efficient for this purpose consists of shields or baffle-plates $l^4$ $l^4$, one for each pawl, which are arranged to extend between the pawls and the teeth $h$, as indicated in Figs. 5 and 6. These plates are preferably connected or formed integrally with a frame M, which, suitably journaled upon a stud $m$, that extends upward from the disk I, is provided with a curved or arched portion which rests upon and supports the frame from a center $m'$, secured in and extending from said stud, as best shown in Fig. 7. As thus supported and arranged this frame M is capable of an oscillatory motion upon and around its supporting-stud $m$ independently of the disk I. When the frame M is in its normal position—as, for instance, when the material passing through the machine is of the proper size to make a sliver of the required cross-section and weight—the shields or baffle-plates will be held beneath the pawls $k$ $k$, and in these positions the latter will be compelled to ride in their short backward and forward movements upon the upper surfaces of shields and their engagement with the teeth $h$ of the ratchet L thereby prevented. When, on the other hand, the material passing through the machine is above or below the required size and weight, then the frame M will be swung in the required direction upon its supporting-stud $m$ to bring the appropriate shield or baffle-plate from under a portion of the back-and-forth travel of its coöperating pawl, allowing such pawl to drop down into engagement with the proper tooth of the ratchet-wheel L to cause this wheel and through it the disk I, the flange $g$, and the belt-shifter O to move in the required direction to properly regulate the speeds of rotation of the back and front drawing-rolls to produce a sliver of the standard size. It will thus be evident that in order to control or regulate the engagement of the pawls with the teeth all that is necessary is to effect the movements of the shields or baffle-plates in such manner as to move them more or less from under one or the other of the pawls, and this is accomplished by simply swinging the frame M upon its pivot at the required time and in the required direction.

To accomplish the swinging movements of the frame M automatically as the requirements of the material passing through the machine may demand, various means may be employed. I prefer, however, to make use of the material-guiding trumpets N and S for that purpose, as thereby I am enabled to avail of the variations in the size and weight of the material to effect the required movements both before and after such material passes the drawing-rolls. When this form of mechanism is employed for the purpose, the trumpet N is preferably arranged in rear of the calender-rolls $d$, being fixedly secured to a shaft $n$, which, rotatably mounted upon the frame of the machine by a bearing $n^3$ at one end and a pivot or center $n^4$ at the other, is connected with the frame M through the intermediaries of the arm $n'$ and connecting-rod $n^2$. The trumpet S, on the other hand, is arranged in rear of the extreme rear pair $b^3$ of the back drawing-rolls and, connected with the trumpet N through the connecting-rod $s$, whereby to swing back and forth in unison therewith, is adjustably supported upon pivots or centers 14 in a stand or bracket 15, which in turn is adjustably secured to the upper side of the top or table B by a screw $15^*$. By this arrangement, as will be seen, any swinging or tilting movement of the trumpets toward or away from their coöperating rolls will be communicated through the shaft $n$, arm $n'$, and connecting-rod $n^2$ to the frame M and the particular pawl $k$ answering to such movement thereby brought into or carried out of engagement with the teeth $h$ of the wheel L, as the requirements of that movement may demand. In order, therefore, to cause the proper tilting movements of these trumpets toward and away from their respective coöperating rolls by variations in the size and weight of the material passing through either or both of them, I provide the counterbalancing-weight P', which is supported upon the arm P, that is fixedly secured to the shaft $n$ and serves to hold the trumpets in their normal positions when the material passing through them is of the proper size and weight, while yet permitting of their tilting forward toward their respective coöperating-rolls when the size and weight of the material passing through either of them are increased in size beyond a certain limit and causing them to tilt backward in an opposite direction away from said rolls when the size and weight of such material passing therethrough are reduced below the standard. As a result of this and of the connection of the trumpets with the shields or baffle-plates through the frame M when the trumpets are held in their normal positions by the counterbalancing-weight P', as is the case, for instance, when the material passing through both of the trumpets is of the proper size and weight, the shields or baffle-plates will be similarly held in a central position with respect to their limits of travel, and neither of the pawls $k$ will be allowed thereby to engage with the teeth $h$ of the wheel L. When, on the other hand, the trumpets are tilted from these normal positions, either toward or away from their respective coöperating rolls, by any increase or decrease in the size and weight of the material passing through either of them, then by such movement the shields or baffle-plates will be moved around over the wheel L in one or the other direction and the appropriate pawl $k$ will be brought into engagement with the teeth $h$ to move such wheel in the required direction. The size and weight of the material having been restored to the standard, the trumpets will be returned to their normal positions, carrying with them the shields or baffle-plates, the effect of which will be to withdraw the pawl from engagement with the teeth of the wheel L, and thereby render them inoperative for the time being. In these positions the parts will remain until a further variation in the size and weight of the material passing through the machine occurs, when a further tilting movement of the trumpets will be caused and the movement of parts above specified repeated, and so on, the variation in the size and weight of the material passing through the railway-head by their operation upon either of the trumpets controlling the movements of the shields or baffle-plates, and hence the movements of the disk I.

The disk I, supported and operated substantially as above explained, is connected with a belt-shifter O, which is fitted to slide upon suitable guide-rods $o$ $o$, extending across from one of the frame-brackets A to the other. For making this connection various arrangements of parts may be adopted. In the form shown in Fig. 9, however, the connection consists, essentially, of a pair of upright studs $o'$, which extend upward from the body of the shifter O, and located on opposite sides of the scroll-shaped flange $g$ are supplied with suitable antifriction-rolls $o^2$ for immediate contact therewith. The studs $o'$ are preferably mounted on a swivel-plate $o^3$, that is socketed in the body of the shifter O, whereby to allow of the rolls always assuming a position at right angles to the curve of the flange to avoid cramping of the parts. By this arrangement, as will be seen, the movement of the shifter O along the guide-rods $o$ and the movement of the belt G, with which the shifter engages, longitudinally upon drums E and F are controlled and effected by rotating the disk I in either direction, which, according to the construction and connections so far explained, is effected from or by either or both of the trumpets through the ratchet-wheel L and coöperating pawls $k$, the extent and direction of such movement being regulated by the conditions of the material and the ultimate effect of the arrangement being to diminish the draft upon the material or to increase it the instant that any change is rendered necessary by its condition.

When but a single trumpet is used in rear of the calender-rolls, as N, the counterbalancing-weight P' may be fixedly secured in its proper adjusted position upon the bar P by a set-screw or other convenient means when determined. When, on the other hand, a second trumpet is employed in rear of the back rolls, it is necessary that the counterbalancing-weight P', instead of being fixedly secured in place, should be automatically adjusted along the arm P, and means whereby it may be thus adjusted, as the variation in the size and weight of the material passing to the trumpets may demand, is required. The means whereby this result is accomplished may be of various forms. I prefer, however, to avail of the evener mechanism for the purpose and to so connect it with the counterbalance-weight P' that when the trumpets are moved in either direction from their normal positions and the speed of the back drawing-rolls varied with respect to the speed of the front drawing-rolls through the mechanism above described the counterbalance-weight will be simultaneously adjusted to increase or diminish the tendency of the trumpets to return to their normal positions, according as the material passing through the machine is above or below the required size and weight. To permit of this automatic adjustment of the counterbalance-weight P' by the evener mechanism, one end of the shaft $n$ in the preferred embodiment of my invention is formed as or with a yoke $p^5$, from which the bar P, that receives and carries the counterbalance-weight P', projects. This weight for convenience of application thereto is made in three parts—viz., the outer shell or case $p^*$, that is open at its bottom, and the two interior pieces $p\ p$, fashioned to embrace the bar P and threaded to fit the adjusting-screw Q, presently described. The pieces $p$ are held in place by any suitable means—as, for instance, by the clamp-screw $p'$—while upon the top of the shell or case $p^*$ is arranged a stud or standard $p^2$, that is intended to receive additional weights $p^3$, if required, and which is or may be supplemented at the end of the bar P with a similar stud $p^4$, that may be employed for a like purpose. With these additional weights the rock-shaft $n$ and its appliances can be balanced against any reasonable friction of the material in the trumpets, and in order to aid in adjusting the counterbalancing devices to any required friction of the material passing therethrough I find it convenient to employ the weight $n^5$, which is capable of adjustment outward and inward upon the arm $n^*$, that is secured to the shaft $n$, on the side thereof opposite to that of the bar P, the said weight being held in adjusted position thereon by a clamp-screw, as shown. The balancing or counterbalancing being effected when the trumpet S is in middle position, it is manifest that any slight travel of the weight P' in either direction upon its bar will disturb the equilibrium and permit or cause the trumpets to swing in a corresponding direction.

Q is the adjusting-screw passing through the weight P' and engaging the same, the screw being suitably journaled at one end in a portion of the bar and at the other in the yoke $p^5$, through which the bar is applied to the rocker-shaft $n$, a bevel-gear $q$ being attached to the end of the screw which projects through the yoke. The adjusting-screw is actuated by the rotation of the disk I, for which purpose the periphery of the said disk is supplied with teeth, as indicated. These teeth engage with those of a gear-wheel Q', interposed between the disk I and a pinion $q'$ upon the lower end of a shaft $Q^2$, which shaft is supplied with a bevel-gear $q^2$ at its upper end, arranged to intermesh with the bevel-gear $q$ on the end of the screw Q. In practice the gears $q$ and $q^2$ are arranged in such a position with respect to the axis of the shaft $n$ that the meshing of the teeth thereof will be in line therewith, and the oscillation of this shaft to any required extent may be effected without danger of throwing them out of engagement. From the foregoing it will thus be seen that as the trumpets are forced from their normal positions by any increased friction of the material within either of them and the speed of the back drawing-rolls decreased with respect to the speed of the front drawing-rolls through the operation of the evener mechanism, to increase the draft of the same the adjusting-screw will be turned by the connections described in a direction to force the weight P' along its bar away from the shaft $n$, the result of which will be to increase the leverage of this weight upon the trumpets, and thereby increase the tendency of the latter to return toward their normal positions. On the other hand, when the trumpets are moved in the opposite direction such weight will be shifted toward the shaft and the return of the trumpets to their normal positions by the material passing through it more easily effected. Thus, as will be seen, the material being treated is itself made to determine and regulate the size and weight of the sliver produced, and this whether the variations in the material delivered to the machine are large or small or are of extended or restricted lengths.

As sometimes occurs, the condition of the material passing through the machine may be such, from accident or other causes, as to preclude the possibility of the evener mechanism being able to properly even it and produce a sliver of the required size and weight, and in such case or when the mass of material breaks before it reaches the rear trumpet S it is plain that a continuing movement of the screw Q would force the counterbalance-weight P' too far in one direction or the other, to the damage of the machine. To prevent the possibility of such damaging action, I employ a pair of studs R R', which may be conveniently located in the wall of the protector $R^2$ at the required distance apart or otherwise sustained, and provide the weight P' with an inclined rib $r$, which is arranged to contact with one or the other of these studs when near the limit of its travel in either direction. As thus arranged this rib will, as shown in Fig. 12, ride upon the stud R' as the weight is drawn toward the shaft $n$, with the effect of turning said shaft so as to bring the proper shield or baffle-plate under its pawl, while, on the other hand, it will ride under stud R as the weight is forced in the opposite direction, with the similar effect of turning the other shield or baffle-plate under its pawl, in either case stopping the further operation of the evener mechanism and the further turning of the screw, with the consequent effect of obviating the breakage of parts or other damage thereto.

As a further preventive to the breaking of parts in the event of either of the studs R R' being absent, I find it convenient to reduce the size of each end $p^6$ of the screw-rod Q, whereby the weight P' may be run off its thread after it has traversed along the same beyond certain limits in either direction. On the other hand, to insure of this weight running onto the thread of the screw-rod after having been run off the same and the direction of rotation of such rod reversed I make use of a coiled spring $p^7$ on each of the reduced portions, which is adapted to act against the weight and force it back into engagement with such thread when the screw-rod is rotated in the proper direction.

The connection of the two trumpets N and S when both are employed is represented in Figs. 3, 4, 15, and 16, and consists of a rod $s$, the front end of which is pivotally connected with the front trumpet-arm above its pivotal point, while its rear end is provided with an extension in which is formed a slot $s^2$, communicating with a recess $s^3$ at its inner end. A pin or bolt $s'$, projecting laterally from an upright $s^6$, which forms a part of the pivotal frame of the trumpet S, is normally contained in the recess $s^3$, and hence the two trumpets must move together as long as the pin $s'$ is within the recess $s^3$; but whenever the operator desires to withdraw the rear trumpet S from its normal proximity to the drawing-rolls, as when the material is to be threaded therethrough in "piecing up the end," as it is sometimes called, or when he desires to swing the front trumpet N back from the calender-rolls for a like purpose without disturbing the back trumpet S, all that is necessary on his part is to slightly lift the rear end of the bar $s$ to bring the slot $s^2$ into line with the pin $s'$, when either trumpet may be moved independently of the other. While thus the two trumpets N and S are shown as connected so as to move back and forth together and in unison, this connection is not essential, but has been adopted in the exemplification of the invention as a convenient arrangement for connecting the rear trumpet S with the evener mechanism, and instead of being connected thereto through the trumpet N it may, as is obvious, be connected to it through means that are independent thereof; but whatever this connection may be I prefer to make use of the several weights before referred to to balance and counterbalance the friction on both trumpets, as well as the weights of the various parts with which these trumpets are connected or made to coact.

If the increase and decrease in the friction of the material passing through trumpet S, due to increments and decrements in the size and weight of the material, were directly proportional to such increments or decrements, or if the movement of the weight P' along its arm P maintained a similar proportion to the movement of the belt G upon the drums to correct it the snail-wheel $g$ or its equivalent might be made uniform or made to produce a uniform shifting of the belt. I have found in practice, however, that this increase and decrease in the friction bears no proportion to the increments and decrements in the size and weight of the material and that the same is true respecting the movements of the weight along its arm and of the belt upon the drums. As a consequence of this if the belt-shifter be made to travel uniformly the movements of the trumpets back to their normal positions after having been deflected therefrom is not wholly accomplished and the defect sought to be remedied by such deflection is more or less continued. To obviate this and to insure of the return of the trumpets to their normal positions after they have been deflected therefrom and the drawing has been restored to its standard size and weight, I might employ the devices indicated in my before-mentioned Patent No. 565,084. I prefer, however, to employ the curve or cam, which has been laid out on differentiated radii, as above explained, with the connections to impart a gradually increasing or decreasing change in the relative speed of rotation of the rear drawing-rolls with respect to that of the front drawing-rolls, accordingly as the variation in material delivered to the railway-head is above or below the standard size. By the arrangement and connections shown also, as will be seen, the travel of the weight P' along its arm will be at all times relatively proportionate to and in correspondence with the variations in speed produced in the drawing-rolls, and it will therefore afford the necessary counterbalance to the trumpets when the latter are deflected from their normal positions, so that with the variations in speed referred to the drawing delivered will be of the standard size and weight.

By arranging devices for controlling the movements of the evener mechanism in rear as well as in front of the drawing-rolls, upon which variations in the size and weight of the material passing through the railway-head may act, as was explained in my before-mentioned Letters Patent, not only is such evener mechanism brought into operation to effect the necessary evening action upon the material by variations in the material before it enters the drawing-rolls, but it is also brought into operation to effect that action by variations appearing in the same after it passes those rolls, the result of which is the production of a drawing of uniform size and weight, provided the tendency of the said devices to return to their normal positions is made equal to their deflecting force. With the front trumpet this equalization is effected, as will be understood, by changing the speed of rotation of the rear drawing-rolls with respect to that of the front drawing-rolls by the evener mechanism, whereby the material delivered from them is increased or decreased in size and weight to restore it to its proper normal condition, accordingly as the deflecting force acting upon this trumpet is in a direction away from or toward the calender-rolls, the weight P' serving as the deflecting force in the former direction and the increased friction, due to the enlarged material passing through the trumpet, serving as the deflecting force in the latter direction. With the rear trumpet, on the other hand, this equalization cannot be effected, as is obvious, by thus changing the amount of draft imparted to the material before passing through the railway-head, since being located in rear of the drawing-rolls this trumpet is acted upon by the material before it enters them, and hence before they have an opportunity to act upon it. As a result of this if any variation in the size and weight of the material passing through this trumpet causes a sufficient deflection thereof to set into operation the evener mechanism to correct it in the resulting drawing and the variation continued, as would be the case, for instance, where the product of one of the cards of the series has been added or withdrawn, the deflection of such trumpet would likewise be continued and the evener mechanism maintained in operation to reduce or increase the size and weight of the drawing indefinitely, accordingly as the variation in the size and weight of the material entering it was above or below the standard. To obviate this, the flange $g$, which constitutes the volute snail-wheel on the under side of disk I and through which the belt-shipper of the evener mechanism is operated, is preferably laid out substantially after the manner depicted in Fig. 8—that is, the radii to points at different angular distances from each other are differentiated as to length, the differentiation decreasing rapidly at the inner portion of the curve, but increasing gradually as its outer extremity is approached.

With the drums E and F both constructed in the form of cones and arranged with the larger end of one opposite the smaller end of the other, as heretofore, a belt-shifter for each drum is essential, which in order to permit of the other being operative is compelled to travel in its movement along its drum in a plane parallel to the axis of the latter. Moreover, with the drums as thus constructed the speed of travel of their connecting-belt, as well as the amount of surface with which it frictionally engages on the driving-drum, is constantly being varied, and as a consequence of these the amount of the slip of the belt on the driving-drum is similarly varied, being slight when on its larger end and considerable when on its smaller end. By constructing the driving-drum E in the form of a cylinder, on the other hand, while the driven drum F is left in the form of a cone, not only are the objections pointed out obviated and both the speed at which the belt G travels and its frictional hold upon the drum E made uniform at all times, but one of the belt-shifters may be dispensed with and the other so disposed as to operate with greater efficiency. The belt-shifter O thus retained, of whatever form it may be, I arrange to travel in a plane parallel to the surface of the conical drum F, whereby to maintain it in close relationship to the face of such drum at all points of its traverse, and to this end the guide-rods $o\ o$, upon which it is mounted, instead of extending across from one of the side brackets of the machine to the other in planes parallel to the axis of the drum, are arranged to extend across from one of such side brackets to the other in planes parallel to its face, as shown in Fig. 4.

All the advantages of adjustment of the cone-belt shifter, before referred to, by use of the peculiar snail-wheel bearing against the studs on the shifter may be secured by use of belt connections with the shifter, as indicated in Fig. 20, wherein the snail-wheel is replaced by a cam T, which is laid out on the same general plan as explained for the snail-flange on the under side of disk I. In this form the yoke O' is practically the same as the yoke O in Fig. 9, though having slightly-different outlines. A belt T' or two sections of belt united at the yoke O' extend from the inner portion of the cam upon a part of its surface back around a pulley $t$, suitably sustained from the side bracket of the machine or otherwise, thence to its connection with the yoke, as at $t'$, thence around another pulley $t^2$, similar to pulley $t$, and its extremity connected with the outer portion of the cam. The arrangement being as thus indicated, it is plain that as the cam is rotated in one direction or the other it will through the applied belt move the yoke in the manner required, and this construction and arrangement of the mechanism is an equivalent modification of that before described. In this modified form it is preferred to use a steel belt; but a chain or cord may be employed, if desired. Other and further modifications of the means for imparting a variable traverse to the belt may be adopted, as is obvious; but those above described are believed to be sufficient to disclose the nature of my invention so far as this feature extends and illustration and description of other forms thereof are considered unnecessary.

Aside from shifting the belt in the manner described it is necessary to provide means for keeping the belt at a working tension, no matter to what position it may be shifted or how much it may stretch, and this should be effected automatically without increasing the power required to drive the belt. To accomplish this result, I preferably journal the ends of the axis of the cylindrical drum E in an automatically-adjustable cradle, the side arms of which are composed of two parts 1 and 2, adjustable one on the other to permit of the employment of different-sized gears $e^3$, the parts 1 carrying the bearings $e$ for the axis of the drum, before referred to, and the lower parts 2, being in angular form, are journaled upon the shaft which carries the gear-wheel $e^2$, through which power is communicated to the drum E. A weight 3 is connected by a chain 4 with the end of a shaft 5 or with a pulley thereon, which chain reaches more or less around said shaft or pulley in one direction. Other pulleys 6 on the same shaft carry each a chain 7, wrapped in the opposite direction therearound and connected at their lower ends to the outer ends of the parts 2 of the cradle, as shown. By this arrangement the tendency of the weights is always to elevate the outer ends of the arms, and thus to swing the drum E away from the cone-drum F, thereby keeping the belt always taut between the two, no matter what its position may be. When the belt is shifted toward the larger end of the cone-drum, the weights are raised, while when moved in the opposite direction they will be lowered, as will be readily understood.

Instead of employing the chain connections, as above explained, more direct application of the weight may be made to the cradle, as indicated in Fig. 19. In this form a weight 8 is mounted on a journaled arm 9, having a segment of a gear 10 arranged to engage a gear 11, connected with the cradle-arm. This weight has a constant tendency to swing the cradle back or toward the left, as shown in said Fig. 19, and thus to hold the cylindrical drum with the belt under tension for the purposes before explained. In both forms the tightening of the belt is automatically effected by moving the drum E and the strain upon the belt is uniform at all points of its traverse.

As shown in Figs. 15 and 16, the rear trumpet is preferably sustained upon the top plate or table in a swinging bow, of which 12 is the vertical arm and 13 the horizontal connecting or cross piece between them, the shell of the trumpet being affixed to the upper ends of the arms in any suitable manner. In my preferred form of construction the bow is pivoted or centered on each side by the center 14, which is adjustable in lugs of a stand or bracket 15, anchored to the top plate or table of the machine by a screw 15*, and made vertically adjustable by a screw 17 passing therethrough. Set-screws 16, passing through a front projection in the horizontal portion 13, are arranged to contact with the bed or table, and thus to determine the ultimate limits of travel of the bow or yoke, and therefore of the sustained trumpet, in a forward direction.

It has been found that not only does the cotton absorb moisture with increased humidity of the air, but it then also condenses more easily, so that more would pass through the trumpet than under other conditions, as it has likewise been found that the quantity which passes through is also affected by different degrees of heat. To compensate for these variations due to heat and humidity, I make the lower jaw of the trumpet somewhat similar to that in Patent No. 565,084; but instead of having a lever opening arrangement I supply a second yoke or bow, made of brass or some material having a greater capacity for expansion and contraction under various temperatures than has the iron of which the trumpet is made. This bow is shown at 18 and rests on the cross-piece 13 of the trumpet bow or yoke, before described, through a set-screw 19, tapped through its central piece, being adapted to contract the opening in the trumpet or permit of the lower jaw thereof to fall back or down to enlarge it, as circumstances may require. As thus constructed each of the legs is bored out throughout a portion of its length, and each has a portion of its sides removed in the form of a slot 19 to allow a circulation of air through the bored-out portion, in which are placed rods 20, of wood or other appropriate material that is acted upon by hygrometric changes in the atmosphere and respectively expands and contracts as the moisture therein increases and diminishes. The lower ends of these rods bear upon the bottom of the cavities in the legs of the bow, and their upper ends bear against projections 21, with which the adjustable jaw of the trumpet is supplied, the said projections extending down into the legs of the bow with a loose fit to provide for free expansion and contraction. Loose-fitting pins 22, entering the bottom of this bow, hold the latter in lateral position on the cross-pieces 13. With this construction and arrangement any change in the temperature or hygrometric condition of the air which will affect the cotton will also affect the rods 20 and the bow 18, closing or opening the mouth of the trumpet as the cotton is increased or diminished in weight or thickness by changes in temperature and humidity.

There are various other constructions by which the desirable result of opening and closing the aperture in the trumpet can be secured while using substantially the same principles as above explained. For instance, as indicated in Figs. 17 and 18, the lower jaw of the trumpet may be made rigid and provided with a pocket or cavity in which a block 23 of suitable substance of the character of that employed in the rods 20 is located and over which is placed a plate of iron 24 for the material to pass over. As thus arranged any expansion or contraction of the block 23, as is manifest, will cause the plate 24 to be protruded into or withdrawn from the interior of the trumpet, and thereby to reduce or increase the size of the aperture in the trumpet, as is the case with the rods and bow 20 and 18 in the construction shown in Figs. 16 and 17. While this is an important and prominent feature of my invention, it is not indispensable to the remainder of the machine, which may be provided with other forms of trumpets—as, for instance, those contemplated by Patent No. 565,084, or with trumpets of the ordinary construction.

With the parts above described I provide means whereby the main driving-belt may be automatically shipped from the fast driving-pulley $c$ to the loose pulley $c'$ the instant that the mass of material passing to the machine is broken and the operation of the machine thereby arrested to be started again by the operator as soon as this break has been repaired. To this end the shipper-arm 25, which carries the belt-spanner, is pivoted at about its middle point to a stand or bracket 26, secured to one of the frame-brackets A, with the upper end of this arm jointed to a shipper-rod 27, mounted in stationary rests 28 29, secured to the rear edge of the table or top B and through which it may move back and forth far enough to communicate the requisite amount of movement to the shipper-arm 25. To the outer side of this rod is pivoted a latch-piece 30, which extends through the rests 28 or is otherwise arranged to engage therewith by its notched portion 31, while coöperating therewith is a spring 34, of sufficient strength for the purpose which connects at one end with such rod and at the other with some stationary portion, as with the rest 29. When the latch is in engagement with rest 28, the shipper-rod will hold the driving-belt upon the fast driving-pulley $c$. On the other hand, when the latch-piece is raised, so as to disengage the notched portion thereof, then the spring 34 will act by its resiliency to draw the rod along in the rests 28 and 29, and through the connections described ship the belt over to the loose pulley $c'$.

To trip the latch at the instant desired, I have devised the simple means shown and next to be described; but these may be replaced by others of an equivalent form, if desired.

Fixedly secured upon shaft D is an eccentric 35, which communicates a reciprocating movement to a rod or bar 36, which is pivoted at one end to the band of the eccentric, whereby to permit of a universal movement being given thereto, and is sustained at its opposite end by a rocking lever 37, that is pivoted at 37*, the said lever being supplied with a pin 38, which enters a downwardly-inclined slot 39 in the end of such bar. As long as the rocking lever 37 is free at its upper end the eccentric 35 will cause the bar 36 to move backward and forward and the lever 37 to rock without any other effect; but the instant the rocking lever is arrested, as it will be when the mass of material passing to the machine breaks, then the retracting movement of bar 36 will compel its outer slotted end to ride up on the pin 38 and be thereby elevated. The outer end of this bar being thus moved is provided with an adjustable block or shoe 40, which may be set to contact with the end of latch-piece 30, and as a result thereof the latter will be raised or "knocked off" as the outer end of this bar is thus raised and the driving-belt shipped from the fast to the loose pulley the instant this rocking lever 37 is arrested. To accomplish the stoppage of the movement of this rocking lever by the breaking of the mass of material passing to the machine, this material is made to ride over a pivoted lever 41 as it is drawn into the rolls. This lever is provided at its lower end with a hooked portion 41$^b$ for engaging the upper end 37$^a$ of rocking lever 37 and is so mounted and arranged that as the material bears upon its top the pressure thereon will be sufficient to hold the hooked end out of the path of movement of the upper end 37$^a$ of the rocking lever 37, but permit of its dropping down and engaging with the upper end of the rocking lever when this pressure is removed by the breaking of the mass of such material passing to the machine, and thereby bringing into action the other parts, as before explained.

To enable the operator to shift the belt from the loose to the fast pulley to start the machine, I provide a shaft 49, which is mounted in suitable bearings secured to the frame of the machine and having handles 50 at its upper end. The lower end of this shaft 49 is provided with an arm 51, fixedly secured thereto and loosely connected at its outer or free end to the shipper-rod 27. As thus arranged when the operator wishes to ship the belt from the loose to the fast pulley he simply oscillates the shaft 49 through one of the handles 50, and thereby causes the arm 51 thereon to slide the shipper-rod 27 along in the rests 28 and 29 until the notch 31 of latch 30 engages its stop 28.

For operatively connecting the rear pairs of drawing-rolls $b'$ $b^2$ $b^3$, whereby to insure of their proper relative rotation with respect to one another, various arrangements of gearing may be employed. I prefer, however, to connect the under roll of the pair $b^2$ with the under roll of the pair $b^3$ through the intermediary of a gear $b^{20}$, which intermeshes with both a gear $b^{21}$ on the former roll and with a gear $b^{22}$ on the latter roll, and to similarly connect the under roll of the pair $b'$ to the same roll of the pair $b^3$ through the instrumentality of a gear $b^{23}$, which likewise intermeshes with a gear $b^{24}$ and a gear $b^{25}$, with which these last-mentioned rolls are respectively provided. To impart the necessary rotation to these rolls, I find it convenient to employ the gear $f^5$, which, as hereinbefore described, is secured to the lower roll of the pair $b^3$ and is driven by the shaft $f^3$. While I have shown but four pairs of drawing-rolls, it is to be understood that a greater or lesser number of pairs may be employed, if desired.

It is to be understood that the words "front" and "rear" as hereinbefore used in connection with the trumpets and drawing-rolls are employed in the sense that the material enters the machine at the rear and the sliver leaves it at the front.

From the foregoing specification it will be seen that I produce a railway-head which is well adapted to the evening of the larger and smaller variations in the size and weight of the material passing through it with equal facility and that I accomplish all the before-indicated objects of the invention by improvements which are simple, reliable, and effective for the purposes intended. Further than this, it will also be seen therefrom that by reason of the connection of the front drawing and calender rolls with the driving-shaft of the machine through the upright shaft and the various gears I avoid the usual irregular speed of rotation of these parts due to the slipping of the driving-belts and produce a machine in which their operation is positively effected.

Although in the foregoing I have described the best means contemplated by me for carrying my invention into practice, I wish it distinctly understood that I do not limit myself strictly thereto, as it is obvious that I may modify the same in various ways without departing from the spirit thereof—as, for instance, instead of using a trumpet in rear of the calender-rolls and a similar trumpet in rear of the back rolls I may, if I so desire, employ but a single trumpet, which in that case will be arranged in rear of the calender-rolls. Again, while I have shown and explained my improvements as applied to "railway-heads," so called, it is manifest that many of the features may be employed with equal advantage in connection with drawing-frames and other forms of machinery made use of to effect the transformation of cotton fiber into yarn, and I intend so to apply them. Again, instead of employing a cylindrical and a conical drum I may, if I so desire, employ two conical drums—as shown, for instance, in my before-mentioned Letters Patent.

Having now described my invention and specified certain of the ways in which it is or may be carried into effect, I claim—

1. The combination with the front drawing-rolls, the calender-rolls, and the evener mechanism belt-shifter, of the main driving-shaft, an upright shaft driven thereby, connections from said upright shaft to the front drawing-roll and to the calender-rolls and to the said belt-shifter for operating them positively, and means located both in the rear of the calender-rolls and of the drawing-rolls for controlling the movements and position of the belt-shifter according to the size and weight of the material passing to either or both of said sets of rolls.

2. The combination with the front drawing-rolls having connections with the main driving-shaft for positively driving them at a constant speed therefrom, of the rear drawing-rolls also having positive driving connections with the main shaft, the calender-rolls, devices for varying the speed of the rear drawing-rolls relatively to the speed of the front drawing-rolls, and means located both in the rear of the calender-rolls and of the drawing-rolls for controlling the variation of speed of the drawing-rolls according to the size and weight of the material passing to the calender-rolls or to the drawing-rolls.

3. The combination with the front drawing-rolls and the calender-rolls both having connections with the main driving-shaft for positively driving them at constant relative speeds, of the rear drawing-rolls also having positive driving connections with the main driving-shaft, devices for varying the speed of the rear drawing-rolls relatively to the speed of the front drawing-rolls, and means located both in the rear of the calender-rolls and of the drawing-rolls for controlling the said variation of speed according to the size and weight of the material passing to either the drawing-rolls or the calender-rolls, substantially as described.

4. The combination with the drawing-rolls, of a cylindrical drum, a conical drum, the cylindrical drum being mounted to swing toward and from the conical drum, a belt connecting the two drums, a belt-shifter mounted and arranged as explained whereby to travel back and forth in directions parallel with the face of the conical drum, means for positively driving the swinging cylindrical drum in whatever position it may be, and devices for communicating motion from the conical drum to the drawing-rolls, substantially as described.

5. The combination, with the drawing-rolls and an evener mechanism for varying the speed thereof, said evener mechanism including a cylindrical drum, a conical drum, a belt, a belt-shifter, and devices for communicating a variable traverse to the said belt-shifter, substantially as described.

6. The combination with the evener mechanism belt-shifter, of a disk having a cam or snail wheel connected thereto for operating the shifter, and means for moving the disk in either direction and supporting it with the cam or snail wheel in proper position with respect to the shifter, the action of the cam or snail wheel being in the direction of the plane of the disk, substantially as described.

7. The combination with the evener mechanism belt-shifter, of a disk, means for communicating movement to said disk in either direction, and a cam or snail wheel connected with the disk and with the shifter for operating the latter, the action of the cam or snail wheel being in the direction of the plane of the disk and the curve of the said cam varying substantially in the manner and for the purposes set forth.

8. The combination, with drawing-rolls and an evener mechanism, of an intermediate deck or plate located above the evener mechanism to protect the belt thereof and other parts from the dropping of oil thereon, substantially as described.

9. The combination, with the evener mechanism, of the disk movable in either direction and carrying the cam or snail wheel having connections for imparting movement to the belt-shifter of the evener mechanism, a deck or plate above the disk, a wheel located above said plate and projecting through it and connected with said disk, and devices for operating said wheel, substantially as described.

10. The combination with the ratchet-wheel, a deck or plate, and a cam or snail wheel supported thereby, of a pawl-carrier also supported by such deck or plate and provided with pawls and means for reciprocating this carrier, shields or baffle-plates interposed between the pawls and the teeth of the ratchet, a movable frame carrying said shields or baffle-plates, and means for controlling the position of said frame and baffle-plates from the material being acted upon, substantially as described.

11. The combination with the pawl-and-ratchet devices, and a disk carrying a cam operated from such devices, the cam being adapted to act in the direction of the plane of the disk, of a stud rising from said disk, a frame mounted on said stud and having shields or baffle-plates for controlling the action of the pawls, and means for moving said frame on the stud, substantially as described 12. The combination, with the disk carrying the curved cam flange or scroll, of stationary guide-rods, and a belt-shifter mounted and movable upon said guide-rods and carrying a swiveled plate, said plate being provided with studs to bear upon each side of the flange, substantially as described.

13. The combination, with the trumpet, a shaft to which it is connected, and an evener mechanism, of a bar connected with the shaft, a sliding weight mounted on said bar, a screw for moving the weight back and forth, and gear connections between said screw and the evener mechanism, the said screw having reduced ends to prevent excessive movement of the said weight on the screw, substantially as described.

14. The combination, with the trumpet, and the bar connected therewith, of the sliding weight mounted upon said bar, and having the inclined rib on the side thereof, and fixed studs or projections with which this rib engages when moved in either direction, to raise or lower the weight, substantially as described.

15. The combination, with the front and rear trumpets, of the rod connecting them and having a slot and recess at one end for engaging a pin connected with the frame of one of the trumpets, to permit the latter to swing or be swung back when required, substantially as shown and described.

16. The combination, with an evener mechanism including two drums, a belt connecting the two drums and means for shifting the belt to obtain variations in speed, of swinging arms, for supporting one of said drums and a weight connected with the arms to swing the said drum away from the other drum to keep the belt under a constant tension at any of the positions to which it may be shifted, as set forth.

17. The combination, with the driving-drum of the evener mechanism mounted in journaled arms constituting a swinging cradle, of a weight having connections with a shaft and operating to turn the same in one direction, and connections between the said shaft and the arms of the cradle, whereby the downward tendency of the weight will elevate the outer ends of the cradle-arms, substantially as shown and described.

18. The combination, with a trumpet having a movable jaw or section for varying the size of the opening through the trumpet, of connections with the said jaw adapted to move the same, said connections being of a material adapted to be changed in its dimensions by changes in atmospheric temperature and humidity, substantially as described.

19. The combination, with a trumpet mounted in a swinging bow, of a second bow applied upon the first, the arms of the latter carrying blocks of expansible and contractible material bearing against the movable jaw of the trumpet, substantially as shown and for the purposes set forth.

20. The combination, with the belt-shipper and its spring, of a constantly-moving eccentric, the reciprocating bar connected at one end with the band thereof and having an inclined slot in the other end, a rocking lever connected with the reciprocating bar by a pin entering said slot, and a hooked piece over which the material passing to the machine rides, said hooked piece being arranged to arrest the rocking lever when the mass of material passing to the machine breaks, and thus to elevate the outer end of the reciprocating bar and thereby release the shipper-rod, substantially as and for the purposes set forth.

In testimony whereof I have hereunto set my hand this 29th day of March, 1899.

ARTHUR W. MATHEWSON.

Witnesses:
FRANKLIN M. DREW,
GEORGE W. BELT.